Figure 2:
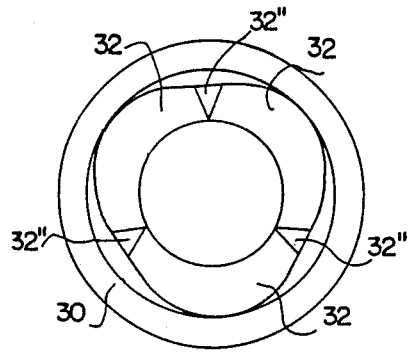

United States Patent [19]

De Bastiani et al.

[11] Patent Number: 4,946,179

[45] Date of Patent: Aug. 7, 1990

[54] SELF-GRADUALLY LOCKING CHUCK

[75] Inventors: Giovanni De Bastiani, Verona; Giovanni Faccioli, Monzambano; Roberto Aldegheri, San Giovanni Lupatoto; Lodovico R. Brivio, Castenedolo, all of Italy

[73] Assignee: Orthofix S.r.l., Verona, Italy

[21] Appl. No.: 309,788

[22] Filed: Feb. 10, 1989

Related U.S. Application Data

[62] Division of Ser. No. 1,578, Jan. 8, 1987, Pat. No. 4,828,277.

[30] Foreign Application Priority Data

Sep. 30, 1986 [IT] Italy .............................. 84947 A/86

[51] Int. Cl.$^5$ .............................................. B23B 31/02
[52] U.S. Cl. ..................................... 279/1 SG; 279/22; 279/75
[58] Field of Search ..................... 279/1 S G, 1 B, 22, 279/55, 57, 58, 59, 66, 74, 75

[56] References Cited

U.S. PATENT DOCUMENTS

| | | | |
|---|---|---|---|
| 685,677 | 10/1901 | Furbish | 279/22 |
| 1,112,349 | 9/1914 | Barnes | 279/74 |
| 2,466,315 | 4/1949 | Johansson | 279/75 |
| 3,767,218 | 10/1973 | Linthicum et al. | 279/75 |
| 3,816,015 | 6/1974 | Bilz et al. | 279/75 |
| 4,171,821 | 10/1979 | Miller | 279/1 B |
| 4,692,073 | 9/1987 | Martindell | 279/1 B |
| 4,828,277 | 5/1989 | De Bastiani et al. | 279/1 SG |

Primary Examiner—Daniel Howell
Attorney, Agent, or Firm—Ladas & Parry

[57] ABSTRACT

The invention is a self-gradually locking chuck for drills and similar devices. It is particularly suitable for portable drills in surgical use. The chuck has a cylindrical sleeve that can be fixed axially to the shaft of a drill and predominantly tapering ferrule with lobes. The ferrule can be axially engaged with the sleeve. Means for centering a tool and at least one spring are located within a hollow space in the sleeve. The chuck also has a mounting with a passage and holes for housing jaws. The mounting and the ferrule are axially movable with respect to each other and the sleeve. Jaws, located in the holes and urged toward the axis of the chuck by the lobes, hold a tool that has been inserted between the jaws. The chuck further has an annular ring which can be screwed onto an externally threaded portion of the mounting projecting from the ferrule. The annular ring serves to engage the tool in a locked condition to prevent accidental release of the tool by the chuck.

8 Claims, 3 Drawing Sheets

SELF-GRADUALLY LOCKING CHUCK

This is a divisional of co-pending application Ser. No. 001,578 filed Jan. 8, 1987, now U.S. Pat. No. 4,828,277.

SUMMARY

The self-gradually locking chuck for drills and similar devices particularly suitable for portable drills for surgical use consists of a cylindrical sleeve (10, 10') which can be fixed axially to the shaft of a drill, a predominantly tapering ferrule (29, 29') with lobes (32, 32') which can be axially engaged with the sleeve, means (23, 23') for centering the tool and at least one spring (26, 26') located within a hollow space (19, 51) in the sleeve and a mounting (34) with a central hole (41) and holes (44, 44', 44") in which jaws (35, 35', 35") are housed, the said mounting and the said ferrule being releasably lockable together and being axially movable with respect to each other and the sleeve, and a ferrule (43, 43') which can be screwed onto an externally threaded portion (38) of mounting (34) projecting from ferrule (29, 29').

DESCRIPTION

The chucks currently in use for hand operated or electrical drills which may be used in surgery clamp a tool, for example a drilling bit, by means of jaws which are tightened on the tool by the use of a pinion key acting on a rack on the chuck. The reverse operation must be performed in order to remove the tool from the chuck.

This method of tightening and opening the chuck is inconvenient and entails a considerable loss of time.

In fact it happens that while one hand holds the body of the drill firmly the other hand inserts that drilling bit and must leave the bit between the jaws in order to turn the locking key. The drilling bit, which is left free, may slip out of the chuck and fall, with the disadvantage that some time is lost in order to recover the bit, or may become jammed between the jaws without adopting a position which is perfectly coaxial with the axis of the chuck.

The need always to use a key for locking and opening lengthens the time required for changing bits, which is a serious disadvantage in particular when the drill is used for surgical purposes, for example.

Another defect of the chucks currently in use is that the drilling bit may slip between the locking jaws, which is particularly inconvenient when for example the drill is used in surgery.

This slippage is sometimes due to the fact that locking means of the key, being unchanging and depending on the strength of the operator, may not be sufficient to ensure that the bit is firmly held when this encounters considerble resistance in the medium being drilled, and sometimes due to the fact that the bit has been locked in a position which is not perfectly coaxial with the axis of the chuck, with the result that during the initial rotations the bit tends to align itself with the chuck leaving play between bit and the locking jaws.

A further inconvenience is due to the fact that the chucks currently in use are particularly difficult to disassemble into their component parts, and sometimes render this impossible, thus giving rise to places in which dirt and therefore germs may lodge. We may in particular mention the rack which is engaged by the pinion key, the jaws themselves and the hollow space within which they are housed, with the result that a long and difficult sterilisation procedure is required before the drill can be used in an operating theatre.

This object of this invention is to overcome the abovementioned deficiencies.

The main advantages of the invention lie in the fact that the procedures for inserting or removing a tool are particularly simple and quick and do not require a locking key, ensure that the shank of the tool is always coaxial with the axis of the chuck and is gradually and automatically clamped between the jaws with the force necessary to prevent any slipping of the tool by vertue of the rotations of the chuck only.

Another advantage lies in the fact that once the tool has been inserted in the chuck, it cannot fall to the ground while the drill is being handled, since it is springly secured among the jaws.

Furthermore, as result of the particularly simple structure of the component parts of the self-gradually locking chuck, the chuck can easily be dismantled and sterilised before use in an operating theatre.

Once the tool has been inserted the special symmetry of the structure of the self-gradually locking chuck increase the automatic locking when the shaft rotates in either one direction or the opposite direction.

A further advantage is provided by the fact that clamping of the tools does not depend on the strengh of the operator but is proportional to the resistance against the rotary motion of any tool held in the self-gradually locking chuck, there being therefore no danger that the bit may slip because the grip is insufficient.

Figure 3:
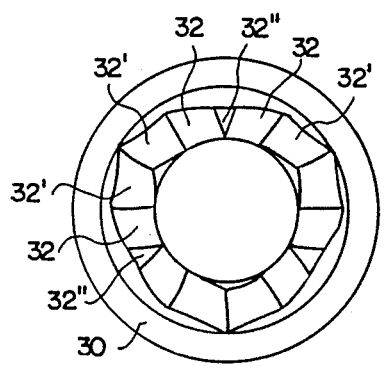
Figure 1:
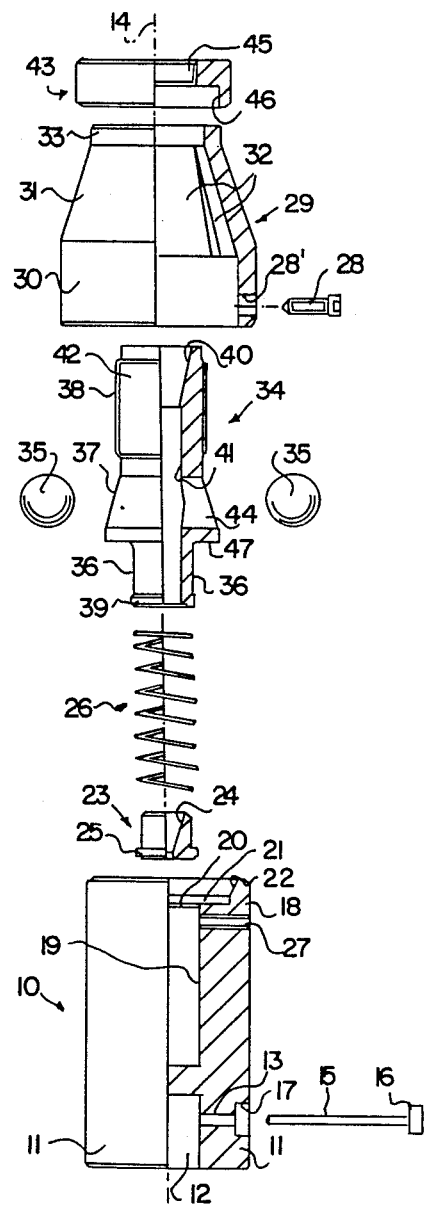
Figure 5:
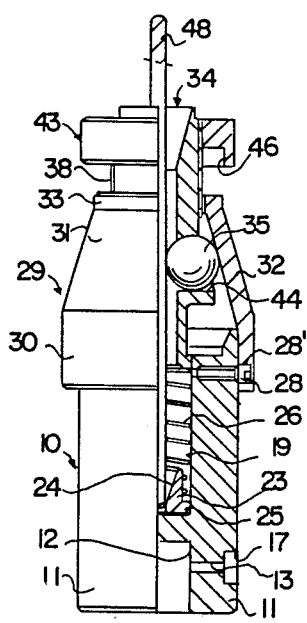
Figure 4:
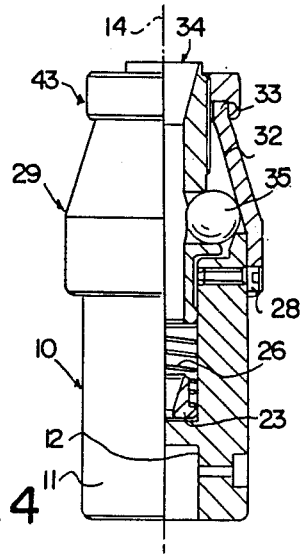
Figure 7:
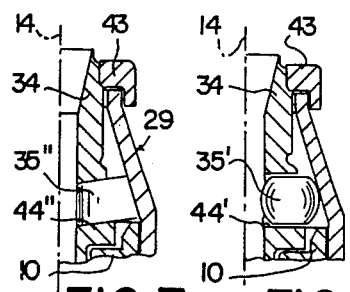
Figure 6:
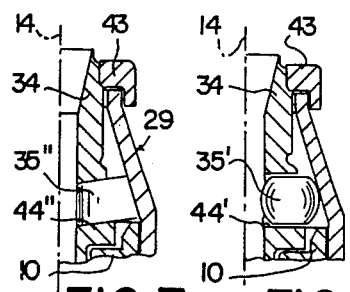
Figure 9:
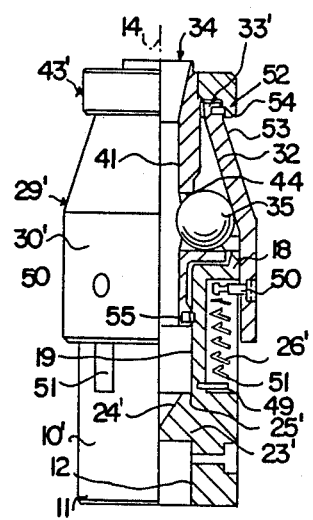
Figure 8:
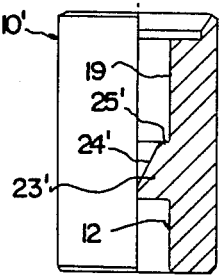

Further advantages will appear in the course of the following detailed description in which some to the possible embodiments of the invention are described by way of example in a non-restrictive manner and illustrated in the attached two sheets of drawings in which:

FIG. 1 provides a diagrammatical exploded view of a gradually self-locking chuck according to the invention in partial cross-section, FIG. 2 povides a view from the base of the tapering ferrule in FIG. 1, FIG. 3 provides a view from the base of a variant embodiment of the ferrule illustrated in the foregoing figure, FIG. 4 provides a view of the assembled chuck in FIG. 1, in partial cross-section, in the position of maximum retraction for the insertion of a tool, FIG. 5 provides a view similar to that in FIG. 4 in which the tool, once it has been inserted, is locked in the chuck through the action of a spring, FIG. 6 provides a view similar to that of FIG. 5, in partly truncated form, with a variant embodiment of the jaws, FIG. 7 provides a similar view to that in the foregoing figure with a second variant embodiment of the jaws, FIG. 8 provides a partial view of the chuck in FIG. 1 with means for centering the tool located within the self-gradually locking chuck itself, FIG. 9 provides an assembled view, in partial cross-section, of another embodiment of the invention.

Figure 10:
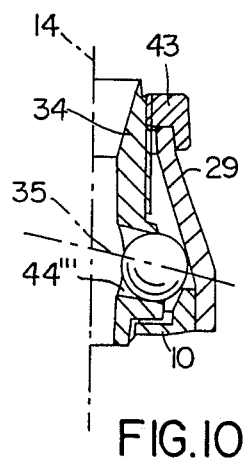
Figure 11:
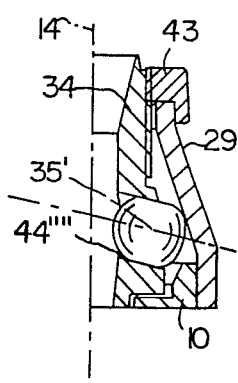

FIG. 10 shows a view similar to that of FIG. 5, with the spheres being movable in a slanted hole, and FIG. 11 shows the barrel shaped rollers movable in a slanted hole.

Bearing in mind that the figures are not to one scale and that like numerical labels correspond to identical or equivalent parts it will be seen in FIG. 1 that the self-gradually locking chuck consists essentially of a sleeve (10), a ferrule (29) within which lies a mounting (34) enclosing the locking jaws which consist of spheres (35).

Sleeve (10), of cylindrical shape, is provided at one end (11) with a cylindrical cavity (12) which is coaxial with the chuck and into which may be inserted the shank of a drill not illustrated in the drawings. For insertion of the shank sleeve (10) is provided with a hole (13) which cuts the axis (14) of the chuck at right angles and provides a seat for the shank (15) of a bolt with a head (16) which may be housed in recess (17). Bolt (15, 16) and the corresponding hole (13, 17) in sleeve (10) and on the shaft of the drill may be replaced by any known means whatsoever, such as through bolts or keys, which are capable of preventing relative rotation of the two components.

The other end (18) of sleeve (10) is provided with a cylindrical space (19) which is itelf coaxial with the axis (14) of the sleeve and is connected at the top via a bevel (20) to an annular recess (21) connected via a tapering thread (22) to the external surface of said end (18). A bush (23) for centering the tool which is to be used with the drill may be placed at the bottom of space (19). For this purpose the said bush (23) has within itself a hole (24) with tapers towards the base and externally an annular cylindrical projection (25) on which rests a cylindrical spiral spring (26) of external diameter slightly less than the diameter of space (19) so that it can extend and contract without any obstruction within the said space.

The ends (11, 18) of said sleeve (10) have suitably bevelled external edges to prevent injury to persons or objects when it is rotated at high speed and in addition to this the chuck may be attached to any one or two speed drill, rotating clockwise or anti clockwise, or a drill of the hammer drill type, without thereby altering the essential characteritics of the invention.

Part (18) of the sleeve is also provided with a threaded hole (27), the axis of which cuts the axis (14) of the chuck at right angles, in order that ferrule (29) may be fixed to sleeve (10) by means of a bolt (28) with a hexagonal socket head.

Although not illustrated in the drawings, ferrule (29) and sleeve (10) may be secured together by means of several bolts (28) placed radially with respect to the axis (14) of the chuck, or by any known means equivalent to those described above.

Ferrule (29) which encloses mounting (34) and spherical jaws (35) has a hollow cylindrical rear portion (30) which can be placed over the end portion (18) of the sleeve in order to be secured by bolt (28) passing through a hole (28'), a central hollow tapering portion (31) internally shaped with lobes (32), within which run spheres (35), and ends in a hollow cylindrical portion (33).

The external edes of the two ends of the said ferrule (29) are bevelled so as to rotating injury to persons or objects while the chuck is rotating.

As will be illustrated below the shaping of the internal surface of the central part (31) plays a fundamental part in securing the bit while the chuck is rotating.

Mounting (34) and spherical jaws (35) are mounted within ferrule (29).

Mounting (34) has a posterior part (36), a central part (37) and an anterior part (38).

Part (36) is a hollow cylinder provided with an annular thickening (39) at its free end which moves axially within space (19) in part (18) of the sleeve.

Cylindrical part (38) has an internal tapering recess (40) for insertion of the posterior end of the shank of the tool, in order that the latter may subsequently be fixed. Said tapering recess (40) continues into a cylindrical hole (41) which also passes to the central (37) and posterior (36) parts of the mounting, this hole corresponding to the maximum diameter of the shank of the tool inserted into the chuck. The external surface of said part (38) is also threaded (42), and cylindrical ferrule (43) is threaded onto this.

Tapering part (37) forms the true enclosures for spheres (35). In addition to axial hole (41) this also has three cylindrical holes (44) placed radially and 120° apart with respect to the axis (14) of the chuck. Spheres (35) which have a diameter slightly smaller than that of the said holes (44) are located in the holes and are constantly pressed towards the axis (24) of the chuck by the surfaces of lobes (32) through the action of spring (26) and subsequently by the rotation of the chuck itself. Said mounting (34), which is partly located within ferrule (29) and partly within sleeve (10), which can move axially with respect to these, is constantly pushed towards the anterior portion of the chuck by cylindrical return spring (26).

Said spring (26) has one end in contact with the lower part of the annular thickening (39) in the posterior part (36) of the mounting, while its other end encloses the external part of centering buch (23) and is supported on the annular projection (25) thereof, finding its own seat in the base of space (19) in sleeve (10).

Ferrule (43) engages the external thread (42) of mounting (34) with its thread (45) and has an internal annular recess (46) to house section (33) of ferrule (29).

Ferrule (43) has the primary function of acting as a "hand grip" for easier grasping by the operator when the latter prepares to insert the tool in the chuck.

As may be seen in FIG. 3, by manual pressure on ferrule (43), which is just threaded on thread (42), mounting (34) may be made to move axially, overcoming the resistance of spring (26), until the posterior part (36) is wholly inserted within space (19) in the sleeve so that the posterior end surface (47) of central portion (37) of mounting (34) does not rest on the base cavity (21). In this position spheres (35) are free to move within holes (44), because of the tapering shape of mounting (29), moving away from the axis (14) of the chuck, up to the maximum possible distance, possibly also as a result of the force exerted upon them by the insertion of the tool in the chuck.

In this way these spheres completely leave cylindrical hole (41). The (48), which is inserted easily through opening (40) until it reaches centering bush (23) is located with its bottom part concentric with the axis of the chuck on account of tapering hole (24). After this the operator lets go of ferrule (43) so that spring (26) expands causing mounting (34) to project with its anterior portion (38) outside cylindrical section (33). During this movement of mounting (34) spheres (35), which are drawn along in this movement, are forced by lobes (32) towards the axis (14) of the chuck so as to exert a certain pressure against the shank of tool (48). It is therefore obvious that the tool will be perfectly coaxial with the axis of the chuck, its lower part being centered by bush (23) and its central part being secured by the three spheres (35) which act on it with a concentric force towards the axis of the chuck. In this position tool (48), although not pushed home into the chuck, remains attached to it during the handling to which the drill may be subjected before it is moved into the correct position to begin work.

After the tool has been inserted as described above ferrule (43) is screwed down until the base of cavity (46) reaches section (33) of ferrule (29).

If the chuck is in the situation illustrated in FIG. 4, that is with the tool inserted but with ferrule (43) not yet screwed down, the user runs the risk that the chuck may open, releasing the tool, and cause inconvenience through accidental impact against ferrule (43) or the part (38) of the mounting projecting from the ferrule.

When however ferrule (43) from the position described above as illustrated in FIG. 5 is screwed down onto the thread (42), mounting (34) is foxed in a specific position with resoect to ferrule (29) and sleeve (10) so that the user no longer runs the risk that the chuck may be opened by an accidental impact against the ferrule which is capable of overcoming the resistance of spring (26) to push mounting (34) into the chuck, displacing spheres (35) from the locking position.

As will be seen particularly in FIG. 2, the tapering internal wall of ferrule (29) has recesses or lobes (32) with a cylindrical or conical surface, or, as will be seen in FIG. 3, these lobes which start at their end with a conical or cylindrical surface end up as inclined planes (32') to increase the distance between the internal wall of the ferrule and the axis (14) of the chuck and permit spheres (35) to be housed in the said lobes (32, 32').

When the chuck is caused to rotate spheres (35) are obliged by inertial forces, regardless of the direction of rotation of the chuck, to rise from the base of the lobes towards the three remaining sectors (32") of the tapering internal wall of the ferrule, thus coming closer to the central axis of the chuck, exerting a greater compression force on the tool. Definitive locking is achieved when the tool begins work, because the friction exerted for example by the medium through which the drilling bit passes causes the spheres to rotate around the axis of the chuck, aiding them to raise along the surface of lobes, (32, 32') and thus rendering the locking force on the bit proportional to the resistance against the rotary motion of the tool fitted to the chuck, thus preventing the shank of the tool from slipping because of inadequate grip.

With particular reference to FIG. 6, it will be noted that jaws (35') instead of consisting of spheres as in the previous figures consist of barrel-shaped rollers which can move in channels (44') of cross-section corresponding to the median cross-section of the rollers, the axes of these channels constituting the generatrices of an ideal conical surface converging towards the axis (14) of the chuck. Again in this case, as in the case of the spherical jaws, there are only three points of contact between rollers (35') and the tool, located radially at 120° around the axis (14) of the chuck.

With reference to FIG. 7, it should be noted that jaws (35") are constructed from rollers having an external frustoconical surface with a generatrix parallel to the axis (14) of the chuck, these jaws being able to move within channels (44") of cross-section corresponding to the median cross-section of rollers (35"), the axes of these channels forming the generatrices of an ideal conical surface converging towards the axis (14) of the chuck as in the situation in the foregoing FIG. 6. In this embodiment jaws (35") are in contact with the tool along three generatrices of the external surface of the jaws and not with only three points as in the foregoing embodiments.

It is obvious from the above that the axes of channels (44) in FIGS. 1 and 5 may also form the generatrices of an ideal conical surface which also converges towards the axis (14) of the chuck without the fundamental characteristics of the invention being thereby altered.

It is obvious to one skilled in the art, even though it is not illustrated in the drawings, that any chuck may be provided with several sets of jaws (35, 35' or 35") spaced along the axis of the chuck and may also for example have more than three jaws.

With particular reference to FIG. 8 it will be noted that the means (23') consist of the tapering base (24') of space (19) which starts from an annular recess (25') in the wall of space (19), this recess forming a seat for spring (26).

With particular reference to FIG. 9 it will be noted that the parts forming the chuck are substantially equivalent to those in FIG. 1 even though they are identified by 10', 23', 25', 26', 29', 30' and 43' in order to distinguish between them. The salient difference is that ferrule (29') is not integral with sleeve (10') but is capable of movement relative to it as a result of three draw springs (26') which are anchored by one end to retaining recesses (49) integral with sleeve (10') and by the other end to recess (50) integral ferrule (29'). The latter recess (50) can be moved within cavity (51) in which the said springs (26') are housed.

In order to insert a tool into this type of chuck the operator must push ferrule (29') upwards in FIG. 9 overcoming the resistance of springs (26') in order to move the chuck into the position in FIG. 9. In this position ferrule (29') remains engaged with ferrule (43') by means of a releasable retaining device (52). Device (52) consists of a spring (53) having a sphere (54) at one end and its other end anchored in a cavity in the cylindrical part (33) of ferrule (29'), the said cavity being bounded by a ring having an internal diameter which is less than the diameter of the sphere. As a consequence, when ferrule (29') enters the cavity in cylindrical ferrule (43') the spring is compressed by sphere (54), which is pushed by the lower internal edge of cylindrical ferrule (43'), and immediately afterwards expands to press the said sphere into an annular groove having a semicircular cross-section of radius corresponding to the radius of the sphere in order to hold ferrule (29') despite the return force exerted by spring (26') when the operator releases ferrule (29') to insert the shank of a tool (48) into the chuck.

For jaws (35) to close again on the shank of tool (48) all that is required is that the operator should place his hand on the external tapering portion of ferrule (29') and exert a slight pressure downwards in FIG. 9 to release the sphere (54) from the annular channel in which it is housed. Springs (26') then automatically move the ferrule (29') downwards, securing and centering the shank of the tool in the chuck.

It should also to be noted that in this particular embodiment of the chuck a check on the precise location of tool shank (36') is obtained by means of a device (55) which is entirely similar in its constituent parts to device (52) described.

It is obvious to one skilled in the art that these devices (52) and (55) can also be applied to the chucks illustrated in FIGS. 1 to 7 and can each be replaced by any known means capable of keeping the two parts associated with these devices together in a separable way.

Subsequent operations such as the screwing up and/or unscrewing of ferrule (43') and the action of jaws (35) are identical to those described previously in relation to FIGS. 1, 4 and 5.

Removal of the tool after unscrewing ferrule (43'), is achieved by pressing ferrule (29') into the position illustrated in FIG. 9, that is to say in the position in which it engages with said ferrule (43') allowing the tool to be removed easily.

Although it is not shown in the drawings the chuck may be constructed so that it is electrically insulated from the drill shaft, for exmple by painting its component with insulating paint.

We claim:

1. A gradual self-locking chuck comprising:
   a sleeve adapted to be fixed to a rotating shaft;
   a ferrule having a frusto-conical portion, a small diameter cylindrical portion and a large diameter cylindrical portion at each end of the frusto-conical portion respectively, the end of the sleeve opposite the rotating shaft being received within the larger diameter cylindrical portion of the ferrule;
   a mounting having a longitudinal axis and located at least partially within the ferrule and having a longitudinal passage running therethrough, the mounting having at least two holes therein, locking jaws located between the mounting and the ferrule at the holes, the locking jaws movable between a first unlocked condition in a radially outer position relative to the longitudinal axis of the mounting, and a second locked condition in a radially inner position relative to the longitudinal axis of the mounting, the locking jaws being adapted to engage a tool located in the longitudinal passage when in the locked position, the mounting having a central portion, an anterior portion which projects through the smaller diameter cylindrical portion of the ferrule, and a posterior portion located at least partially within the larger diameter cylindrical portion of the ferrule, the holes through which the jaws move being located in the central portion of the mounting;
   means for permitting relative movement between the mounting and the ferrule, such relative movement moving the locking jaws between the radially outer and radially inner positions; and
   an annular ring located coaxially with and adjacent the smaller diameter cylindrical portion of the ferrule, and means for securing the annular ring to the anterior portion of the mounting projecting beyond the smaller diameter cylindrical portion of the ferrule, and retaining means between the annular ring and the ferrule for releasably securing the annular ring and the ferrule to each other, the annular ring when firmly secured to the small diameter portion of the ferrule engages the tool in the second locked condition preventing accidental release of the tool by the chuck.

2. A chuck as clamed in claim 1 wherein the locking jaws comprise spheres, the spheres having a median cross-section, the spheres moving within holes of cross-section corresponding to the median cross-section of the spheres, the holes having a longitudinal axis forming the generatrix of an ideal conical surface converging upon the longitudinal axis of the mounting.

3. A chuck as claimed in claim 1 wherein the locking jaws comprise barrel-shaped rollers which move within the holes, the rollers having a median cross-section, the holes having a cross-section corresponding to the median cross-section of the barrel-shaped rollers, the holes having a longitudinal axis forming the generatrix of an ideal conical surface converging upon the longitudinal axis of the mounting.

4. A chuck as claimed in claim 1 wherein the locking jaws comprise barrel-shaped rollers which move within the holes, the rollers having a median cross-section, the holes having a cross-section corresponding to the median cross-section of the barrel-shaped rollers, the holes having a longitudinal axis in a plane at right angles to the longitudinal axis of the mounting.

5. A chuck as claimed in claim 1 wherein the locking jaws comprise rollers having a frusto-conical external surface, a portion of the surface closest to the axis defining a linear line that is parallel to the axis of the chuck, the rollers being capable of movement within the holes, the rollers having a median cross-section, the holes having a cross-section corresponding to the medial cross-section of the rollers, the holes further having a longitudinal axis forming the ggeneratrix of an ideal conical surface converging upon the longitudinal axis of the chuck.

6. A chuck as claimed in claim 1 wherein the ferrule is mounted on the sleeve such that limited relative axial movement is permitted therebetween, the mounting is releasably secured to the sleeve by releasably securing means, and biasing means are provided, the biasing means normally drawing the ferrule towards the sleeve and the mounting, thereby causing the mounting and locking jaws to move within the frusto-conical portion of the ferrule such that the locking jaws are urged towards the radially inner position.

7. A chuck as claimed in claim 6 wherein the retaining means comprise a spring, a sphere at an end of the spring, another end of the spring being anchored in a cavity in the smaller diameter cylindrical portion, the annular ring having a circular groove therein of internal diameter less than that of the sphere.

8. A chuck as claimed in claim 6 wherein the mounting is releasably secured to the sleeve by means of retaining means, the retaining means comprising a cavity in the mounting, a spring mounted in the cavity, a sphere partially projecting from the cavity and urged therefrom by the spring, and a circular groove within the sleeve having a lesser diameter than that of the sphere.

* * * * *